United States Patent
Al-Gahtani et al.

(10) Patent No.: US 7,983,415 B2
(45) Date of Patent: Jul. 19, 2011

(54) METHOD FOR PERFORMING ITERATIVE SCALAR MULTIPLICATION WHICH IS PROTECTED AGAINST ADDRESS BIT ATTACK

(75) Inventors: Theeb A. Al-Gahtani, Dhahran (SA); Mohammad K. Ibrahim, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 958 days.

(21) Appl. No.: 11/640,918

(22) Filed: Dec. 19, 2006

(65) Prior Publication Data

US 2008/0144812 A1 Jun. 19, 2008

(51) Int. Cl.
H04K 1/00 (2006.01)
H04L 9/00 (2006.01)
H04L 9/30 (2006.01)

(52) U.S. Cl. .......................................... 380/30
(58) Field of Classification Search .................... 380/30; 708/620
See application file for complete search history.

(56) References Cited

U.S. PATENT DOCUMENTS

| | | | |
|---|---|---|---|
| 4,200,770 A | | 4/1980 | Hellman |
| 6,065,112 A | * | 5/2000 | Kishida et al. ................ 712/221 |
| 7,724,898 B2 | * | 5/2010 | Naslund et al. ................ 380/30 |
| 2001/0048741 A1 | | 12/2001 | Okeya |
| 2003/0059042 A1 | | 3/2003 | Okeya |
| 2003/0123656 A1 | * | 7/2003 | Izu et al. ........................ 380/30 |
| 2004/0078612 A1 | * | 4/2004 | Kanapathippillai et al. .. 713/324 |

OTHER PUBLICATIONS

Mentens et al. , An FPGA Implementation of an Elliptic Curve Processor Over GF (2Am), Apr. 2004, ACM, 1-58113-853-9.*
P. Kocher, J. Jaffe and B. Jun, "Differential Power Analysis", *Advances in Cryptology: Proceedings of CRYPTO '99, LNCS 1666*, Springer-Verlag, (1999) pp. 388-397.
J. Coron, "Resistance against Differential Power Analysis for Elliptic Curve Cryptosystems", *Cryptographic Hardware and Embedded Systems: Proceedings of CHES '99, LNCS 1717*, Springer-Verlag, (1999) pp. 292-302.
Kouichi Itoh, Tetsuya Izu, and Masahiko Takenaka "Address-Bit Differential Power Analysis of Cryptographic Schemes OK-ECDH and OK-ECDSA", *Cryptographic Hardware and Embedded Systems: Proceedings of CHES '2002, LNCS 2523*, Springer-Verlag, (2002) pp. 129-143.

* cited by examiner

*Primary Examiner* — Vivek Srivastava
*Assistant Examiner* — Samuel Ambaye
(74) *Attorney, Agent, or Firm* — Richard C. Litman

(57) ABSTRACT

The system and method for performing iterative scalar multiplication which is protected against address bit attack is provides a methodology, and system for implementing the methodology, for performing an iterative scalar multiplication process utilizing the Takagi algorithm, the most-to-least binary algorithm, or the least-to-most binary algorithm, modified with either a simultaneous register access operation (SRA) or a general simultaneous register access operation (GSRA). Further, a level-based randomization scheme may be added to provide further security to the algorithms.

17 Claims, 6 Drawing Sheets

METHOD FOR PERFORMING ITERATIVE SCALAR MULTIPLICATION WHICH IS PROTECTED AGAINST ADDRESS BIT ATTACK

BACKGROUND OF THE INVENTION

1. Field of the Invention

The present invention relates to a methodology, and system for implementing the methodology, for performing an iterative scalar multiplication process utilizing the Takagi algorithm, the most-to-least binary algorithm, or the least-to-most binary algorithm, modified with either a simultaneous register access operation (SRA) or a general simultaneous register access operation (GSRA).

2. Description of the Related Art

The field of cryptography provides various methods of providing privacy and authentication for remote communications and data storage. Privacy is achieved through the encryption of data, commonly using the techniques of "symmetric cryptography" (so-called because the same mathematical key is used to encrypt and decrypt the data). Authenticity is achieved through the functions of user identification, data integrity, and message non-repudiation. These are best achieved via asymmetric (or public-key) cryptography.

In particular, public-key cryptography enables encrypted communication between users who have not previously established a shared secret key between themselves. This is most often accomplished using a combination of symmetric and asymmetric cryptography; i.e., public-key techniques are used to establish user identity and a common symmetric key, and a symmetric encryption algorithm is used for the encryption and decryption of the actual messages. The former operation is generally referred to as "key agreement". Prior establishment is necessary in symmetric cryptography, which uses algorithms for which the same key is used to encrypt and decrypt a message. Public-key cryptography, in contrast, is based on key pairs. A key pair consists of a private key and a public key. As the names imply, the private key is kept private by its owner, while the public key is made public (and typically associated with its owner in an authenticated manner). In asymmetric encryption, the encryption step is performed using the public key, and decryption is performed using the private key. Thus, the encrypted message can be sent along an insecure channel with the assurance that only the intended recipient can decrypt it. The key agreement can be interactive (e.g., for encrypting a telephone conversation) or non-interactive (e.g., for electronic mail).

User identification is most easily achieved using what are generally referred to as "identification protocols". A related technique, the use of digital signatures, provides data integrity and message non-repudiation in addition to user identification. The public key is used for encryption or signature verification of a given message, and the private key is used for decryption or signature generation of the given message.

The use of cryptographic key pairs was disclosed in U.S. Pat. No. 4,200,770, entitled "CRYPTOGRAPHIC APPARATUS AND METHOD", which is herein incorporated by reference. U.S. Pat. No. 4,200,770 also disclosed the application of key pairs to the problem of key agreement over an insecure communication channel. The algorithms specified in this U.S. Pat. No. 4,200,770 rely, for their security, on the difficulty of the mathematical problem of finding a discrete logarithm.

In order to undermine the security of a discrete-logarithm based crypto-algorithm, an adversary must be able to perform the inverse of modular exponentiation (i.e., a discrete logarithm). There are mathematical methods for finding a discrete logarithm (e.g., the Number Field Sieve), but these algorithms cannot be performed in any reasonable time using sophisticated computers if certain conditions are met in the specification of the crypto-algorithm.

In particular, it is necessary that the numbers involved be large enough. The larger the numbers used, the more time and computing power are required to find the discrete logarithm and break the cryptograph. On the other hand, very large numbers lead to very long public keys and transmissions of cryptographic data. The use of very large numbers also requires large amounts of time and computational power in order to perform the crypto-algorithm. Thus, cryptographers seek new ways to minimize the size of the numbers involved, and the time and power required, in performing the encryption and/or authentication algorithms. The payoff for finding such a method is that cryptography can be performed faster, cheaper, and on devices that do not require large amounts of computational power (e.g., hand-held smart-cards).

A discrete-logarithm based crypto-algorithm can be performed in any mathematical setting in which certain algebraic rules hold true. In mathematical language, the setting must be a finite cyclic group. The choice of the group is critical in a cryptographic system. The discrete logarithm problem may be more difficult in one group than in another for which the numbers are of comparable size. The more difficult the discrete logarithm problem, the smaller the numbers that are required to implement the crypto-algorithm. Working with smaller numbers is easier and faster than working with larger numbers. Using small numbers allows the cryptographic system to be higher performing (i.e., faster) and requires less memory storage. Thus, by choosing the right kind of group, a user may be able to work with smaller numbers, make a faster cryptographic system, and get the same, or better, cryptographic strength than from another cryptographic system that uses larger numbers.

The groups referred to above come from a mathematical field generally referred to as "finite fields". Methods of adapting discrete-logarithm based algorithms to the setting of elliptic curves are known. However, finding discrete logarithms in this type of group is particularly difficult. Thus, elliptic curve-based crypto-algorithms can be implemented using much smaller numbers than in a finite field setting of comparable cryptographic strength. Thus, the use of elliptic curve cryptography represents an improvement over finite field based public key cryptography.

In practice, an Elliptic Curve group over Fields F(p), denoted as E(p), is formed by choosing a pair of a and b coefficients, which are elements within F(p). The group consists of a finite set of points P(x,y), which satisfy the elliptic curve equation, given by:

$$F(x,y)=y^2-x^3-ax-b=0,$$

together with a point at infinity, O. The coordinates of the point, x and y, are elements of F(p) represented in N-bit strings. In the following discussion, a point is either written as a capital letter, e.g. P, or as a pair in terms of the affine coordinates, i.e. (x,y).

The Elliptic Curve Cryptosystem relies upon the difficulty of the Elliptic Curve Discrete Logarithm Problem (ECDLP) to provide its effectiveness as a cryptosystem. Using multiplicative notation, the problem can be described thusly: given points B and Q in the group, find a number k such that $B^k=Q$; where k is called the discrete logarithm of Q to the base B. Using additive notation, the problem becomes: given two points B and Q in the group, find a number k such that kB=Q.

In an Elliptic Curve Cryptosystem, the large integer k is kept private and is often referred to as the "secret key". The point Q together with the base point B are made public and are referred to as the public key. Thus, the security of the system relies upon the difficulty of deriving the secret k, knowing the public points B and Q. The main factor that determines the security strength of such a system is the size of its underlying finite field. In a real cryptographic application, the underlying field is made so large that it is computationally infeasible to determine k in a straightforward way by computing all the multiples of B until Q is found.

The core of the elliptic curve geometric arithmetic is an operation called scalar multiplication, which computes kB by adding together k copies of the point B. The scalar multiplication is performed through a combination of point-doubling and point-addition operations. The point-addition operation adds two distinct points together and the point-doubling operation adds two copies of a point together. To compute, for example, B=(2*(2*(2B)))+3B=Q, it would take 3 point-doublings and 1 point-addition.

Addition of two points on an elliptic curve is calculated as follows: When a straight line is drawn through the two points, the straight line intersects the elliptic curve at a third point. The point symmetric to this third intersecting point with respect to the x-axis is defined as a point resulting from the addition.

Doubling a point on an elliptic curve is calculated as follows: When a tangent line is drawn at a point on an elliptic curve, the tangent line intersects the elliptic curve at another point. The point symmetric to this intersecting point with respect to the x-axis is defined as a point resulting from the doubling.

Table 1 illustrates the addition rules for adding two points $(x_1,y_1)$ and $(x_2,y_2)$, i.e., $$(x_3,y_3)=(x_1,y_1)+(x_2,y_2).$$

TABLE 1

| Summary of Addition Rules: $(x_3, y_3) = (x_1, y_1) + (x_2, y_2)$ | |
|---|---|
| General Equations | $x_3 = m^2 - x_2 - x_1$ <br> $y_3 = m(x_3 - x_1) + y_1$ |
| Point Addition | $m = \dfrac{y_2 - y_1}{x_2 - x_1}$ |
| Point Doubling $(x_3, y_3) = 2(x_1, y_1)$ | $m = \dfrac{3x_1^2 - a}{2y_1}$ |
| $(x_2, y_2) = -(x_1, y_1)$ | $(x_3, y_3) = (x_1, y_1) + (-(x_1, y_1)) = O$ |
| $(x_2, y_2) = O$ | $(x_3, y_3) = (x_1, y_1) + O = (x_1, y_1)$ |

In elliptic curve encryption and decryption, the user begins with a message point $(x_m,y_m)$, a base point $(x_B,y_B)$, and a given key, k, and the cipher point $(x_C,y_C)$ is obtained using the following equation:

$$(x_C,y_C)=(x_m,y_m)+k(x_B,y_B)$$

There are two basics steps in the computation of the above equations. The first step is to find the scalar multiplication of the base point with the key, i.e. $k(x_B,y_B)$. The resulting point is then added to the message point, $(x_m,y_m)$ to obtain the cipher point.

At the receiver, the message point is recovered from the cipher point, which is usually transmitted to the receiver, along with the shared key and the base point:

$$(x_m,y_m)=(x_C,y_C)-k(x_B,y_B).$$

The steps of elliptic curve symmetric cryptography can be summarized as follows:

First, both the sender and receiver must agree on:
1. A random number, k, that will be the shared secret key for communication, and,
2. A base point, $P=(x_B,y_B)$.

The sender follows the following encryption steps:
1. Embed a message bit string into the x coordinate of an elliptic curve point which is designated as the message point, $(x_m, y_m)$;
2. The cipher point $(x_C, y_C)$ is computed using $(x_c,y_c)=(x_m, y_m)+k(x_B,y_B)$; and,
3. The appropriate bits of the x-coordinate and the sign bit of the y-coordinate of the cipher point $(x_C, y_C)$ are sent to the receiving entity.

At the receiver, the following steps are then performed:
1. Using the shared key, k, and the base point $(x_B, y_B)$, the scalar multiplication $(x_{Bk}, y_{Bk})=k(x_B, y_B)$ is computed;
2. The message point $(x_m,y_m)$ is computed using $(x_m,y_m)=(x_c,y_c)+(-k(x_B,y_B))$; and,
3. The secret messages bit string is recovered from $x_m$.

The steps of elliptic curve public key cryptography can be summarized as follows:

First, both the sender and receiver must agree on:
1. An elliptic curve; and,
2. A base point, $P=(x_B,y_B)$.

At the sender, the following steps are followed:
1. Embed a message bit string into the x-coordinate of an elliptic curve point which is designated as the message point, $(x_m, y_m)$;
2. Using the private key of the sending correspondent, $k_{SPr}$, and the public key of the receiving correspondent, $k_{RPr}(x_b, y_b)$, compute the scalar multiplication $(x_{bk}, y_{bk})=k_{SPr}(k_{Rpr}(x_b, y_b))$;
3. Compute a cipher point $(x_c, y_c)$ using $(x_c, y_c)=(x_m, y_m)+(x_{bk}, y_{bk})$; and,
4. Send appropriate bits of the x-coordinate and the sign bit of the y-coordinate of the cipher point $(x_c, y_c)$ to the receiving correspondent.

At the receiver, the following steps are then followed:
1. Using the private key of the receiving correspondent, $k_{RPr}$, and the public key of the sending correspondent, $k_{SPr}(x_b, y_b)$, compute the scalar multiplication $(x_{bk}, y_{bk})=k_{RPr}(k_{SPr}(x_b, y_b))$;
2. Compute the message point $(x_m, y_m)$ using $(x_m, y_m)=(x_c, y_c)-(x_{bk}, y_{bk})$; and,
3. Recover the message bit string from $x_m$.

"Scalar multiplication" (SM) (or point multiplication) refers to computing the point KP=P+P+P+ ... P(sum taken K times) on the elliptic curve over a given finite field. The integer K is referred to as a "scalar" and the point P as the base point. However, adding the point P to itself K times is not an efficient way to compute scalar multiplication. More efficient methods are based on a sequence of addition (ADD) and doubling (DBL) operations. The doubling operation is simply adding the point to itself.

The computation of the point KP processed by scalar multiplication is performed using the binary expression of K represented by the equation:

$$K=k_{n-1}2^{n-1}+k_{n-2}2^{n-2}+\ldots+k_1 2+k_0$$

where $k_i$ is the $l^{th}$ bit of the binary representation of K, and n is the total number of bits.

There are two common methods of calculating KP. First is the Least-to-Most (LM) algorithm, which starts from the least significant bit of K, and the Most-to-Least (ML) algorithm which starts from the most significant bit of K. The LM algorithm is given by:

```
INPUT      K, P
OUTPUT     KP
1. Initialize Q[0] = O, Q[1] = P
2. for i = 0 to n−1
3.     if k[i] == 1 then
4.         Q[0] = ADD(Q[0],Q[1])
5.     end if
6.     Q[1] = DBL(Q[1])
7. end for
8. return Q[0];
``` and, the ML algorithm is given by:

```
INPUT      K, P
OUTPUT     KP
1. Initialize Q[0] = P
2. for i = n−2 downto 0
3.     Q[0] = DBL(Q[0])
4.     if k[i] == 1 then
5.         Q[0] = ADD(Q[0],P)
6.     end if
7. end for
   return Q[0].
```

In the LM algorithm, $Q[0]$ is initialized to the identity point O, and $Q[1]$ to the base point P. If $k_i=1$, the elliptic curve addition, ADD, is performed on the points $Q[0]$ and $Q[1]$ in step 4 and the result is stored in the point $Q[0]$, otherwise (i.e. for $k_i=0$) $Q[0]$ remains unchanged. The elliptic curve doubling, DBL, is performed on the point $Q[1]$ in Step 6, and the result is stored in the point $Q[1]$. This point doubling operation in step 6 is performed in all cases regardless of the scalar bit value.

The ML algorithm treats the bit string of K starting with the most significant bit first. Since the most significant bit is always 1, the ML algorithm starts from the next most bit, n−2, and initialize $Q[0]$ to P. This kind of algorithms need only one variable, $Q[0]$. First, DBL operation is performed on $Q[0]$ and the result is stored in $Q[0]$ as shown in Step 3. This point doubling in Step 3 is performed regardless of the scalar bit value. If $k_i=1$, ADD operation is performed on the point $Q[0]$ and the base point P in step 5 and the result is stored in point $Q[0]$, otherwise (i.e. for $k_i=0$) $Q[0]$ remains unchanged.

The difficulty in solving the elliptic curve discrete logarithm problem has been established theoretically. However, information associated with secret information such as the private key or the like may leak out in cryptographic processing in real-life situations. Thus, there has been proposed an attack method of so-called "power analysis", in which the secret information is decrypted on the basis of the leaked information.

An attack method in which change in voltage is measured in cryptographic processing using secret information, such as the Data Encryption Standard (DES) or the like, so that the process of the cryptographic processing is obtained and the secret information is inferred on the basis of the obtained process is disclosed in P. Kocher, J. Jaffe and B. Jun, "Differential Power Analysis", *Advances in Cryptology: Proceedings of CRYPTO '99*, LNCS 1666, Springer-Verlag, (1999) pp. 388-397. This attack method is commonly referred to as Differential Power Analysis (DPA).

As shown in the above LM and ML algorithms, performing the ADD operation is conditioned upon the key bit. If the scalar bit value is ONE, an ADD operation is performed, otherwise, an ADD operation is not performed. Therefore, a simple power analysis (i.e., simple side-channel analysis using power consumption as the side channel) will produce different power traces that distinguish between the existence of an ADD operation or not. This can reveal the bit values of the scalar.

One widely used approach to avoid this kind of leak is by J. Coron, published in "Resistance against Differential Power Analysis for Elliptic Curve Cryptosystems", *Cryptographic Hardware and Embedded Systems: Proceedings of CHES '99*, LNCS 1717, Springer-Verlag, (1999) pp. 292-302. He suggests the performance of a dummy addition in the ML method when the processed bit is "0" so that each iteration appears as a doubling followed by an addition operation which is generally referred to as the "Double-and-ADD always" algorithm. Coron's algorithm is given by the following:

```
INPUT      K, P
OUTPUT     KP
1. Initialize Q[2] = P
2. for i = n−2 down to 0
3.     Q[0] = DBL(Q[2])
4.     Q[1] = ADD(Q[0], P)
5.     Q[2] = Q[k_i]
6. end for
       return Q[2].
```

Similar to the LM algorithm, the Double-and-ADD always algorithm can be implemented as follows:

```
INPUT      K, P
OUTPUT     KP
1. Initialize Q[0] = P, Q[1] = P
2. for i = 1 to n−1
3.     Q[0] = DBL(Q[0])
4.     Q[2] = ADD(Q[0], Q[1])
5.     Q[1] = Q[1+ k_i]
   end for
   return Q[1].
```

Another ML-type algorithm for preventing this type of information leak is disclosed in U.S. Published Patent Application No. 2003/0123656, entitled "ELLIPTIC CURVE CHRYPTOSYSTEM APPARATUS, STORAGE MEDIUM STORING ELLIPTIC CURVE CRYPTOSYSTEM PROGRAM, AND ELLIPTIC CURVE CRYPTOSYSTEM ARITHMATEC METHOD". This algorithm uses extra ADD operations to assure that the sequence of DBL and ADD operations is carried out in each iteration. This algorithm, referred to as Takagi's algorithm, is given by:

```
INPUT      K, P
OUTPUT     KP
1. Initialize Q[0] = P, Q[1] = 2P
2. for i = n−2 down to 0
3.     Q[2] = DBL(Q[k_i])
4.     Q[1] = ADD(Q[0], Q[1])
5.     Q[0] = Q[2− k_i],
6.     Q[1] = Q[1+ k_i]
7. end for
       return Q[0]
```

However, even if an algorithm is protected against single power analysis, it may succumb to the more sophisticated differential power analysis (DPA). Assuming that the double-and-add always method is implemented with one of the previous algorithms (i.e., Coron's algorithm, the LM double-and-ADD always algorithm, or Takagi's algorithm), then we may represent the scalar value K in binary as:

$$K = k_{n-1}2^{n-1} + k_{n-2}2^{n-2} + \ldots + k_1 2 + k_0,$$

where $k_i$ is the $l^{th}$ bit of the binary representation of K, and n is the total number of bits. DPA is based on the assumption that an attacker already knows the highest bits, $k_{n-1}, k_{n-2} \ldots k_{j+1}$, of K. Then, the attacker guesses that the next bit $k_j$ is equal to "1", and then randomly chooses several points $P_1, \ldots, P_t$ to compute:

$$Q_r = \left( \sum_{i=j}^{n-1} k_i 2^{i-j} \right) P_r, \text{ for } 1 \leq r \leq t.$$

Based on statistical information of these points (i.e., $Q_r$, $1 \leq r \leq t$), the attacker can decide whether his or her guess is correct or not. Once $k_j$ is known, the remaining bits, $k_{j-1}$, $k_{j-2} \ldots k_0$, are recovered recursively, in the same way.

J. Coron, in "Resistance against Differential Power Analysis for Elliptic Curve Cryptosystems", *Cryptographic Hardware and Embedded Systems: Proceedings of CHES '99*, LNCS 1717, Springer-Verlag, (1999) pp. 292-302, proposed the following randomization-based countermeasure steps, which are effective against differential power analysis attacks:

1. Randomizing the Base-Point P
  a. Compute Q=kpas Q=(P+R)−kR for a random point R;
2. Using Randomized Projective Coordinates:
  a. For a random number r≠0, the projective coordinates, (X, Y, Z) and (rX, rY, rZ) represent the same point. So for a random number r, if P=(x0, y0), Q is computed as Q=k (rx0, ry0,:r); and,
3. Randomizing the Scalar K
  a. If n=$ord_E$(P) denotes the order of P∈E(F(p)), then Q is computed as Q=(k+r n)P for a random r. Alternatively, one can replace n by the order of the elliptic curve, #E(F(p)).

These countermeasures can be used in combination with Coron's algorithm or Takagi's algorithm (both given above) to protect scalar multiplication computation against both simple power attacks and differential power analysis attacks.

The basic concept behind the "Address-Bit Attack" (ABA) is disclosed in Kouichi Itoh, Tetsuya Izu, and Masahiko Takenaka, "Address-Bit Differential Power Analysis of Cryptographic Schemes OK-ECDH and OK-ECDSA", *Cryptographic Hardware and Embedded Systems: Proceedings of CHES '2002*, LNCS 2523, Springer-Verlag, (2002) pp. 129-143.

This attack is based on the correlation between bit values of the scalar and the location (address) of the variables used in a scalar multiplication algorithm. The countermeasures used to protect against simple power analysis and differential power analysis which are based on randomization of the base point or the projective coordinate do not provide countermeasure against address-bit analysis attacks. Therefore, these countermeasures do not remove the correlation between the bit values of a scalar and the location (address) of the variables used in a scalar multiplication algorithm.

Considering, for example, Takagi's algorithm, the variables' values can be randomized by randomizing the projective coordinates (or the base point) as shown in FIG. 5A. However, FIG. 5B shows that the location of input operand of the DBL operation (dotted line) and the data transfer from either Q[1] or Q[2] to Q[0] (solid line) are correlated to the bit value of the scalar. FIGS. 5A and 5B (and also steps 5 and 6 in Takagi's algorithm) show that, in Takagi's algorithm, the following data transfer is performed based on the bit value of the scalar:

$$Q[0] = \begin{Bmatrix} Q[2] & k_i = 0 \\ Q[1] & k_i = 1 \end{Bmatrix}$$

$$Q[1] = \begin{Bmatrix} Q[1] & k_i = 0 \\ Q[2] & k_i = 1 \end{Bmatrix}$$

Similar correlation exits in Coron's algorithm (in step 5), in which Q[2] is loaded by either Q[0] or Q[1], based on the bit value of the scalar.

It should be noted that any algorithm where the location of the input operands or the location of the result is still dependent on the scalar bit values is vulnerable to ABA. Therefore, randomizing the base point or the projective coordinates as a countermeasure will not help in preventing this kind of attack because the locations of the input and/or output operands are still correlated to the scalar bits.

The process of randomizing the scalar value is also vulnerable to ABA. One might infer that leaking information about the bit values of the randomized scalar, and hence recovering the bit values of the randomized scalar, is acceptable since they do not represent the bit values of the actual scalar. However, the attacker can recover the correct bit values of the actual scalar from the recovered bits of the randomized scalar, as well as knowledge about the scalar randomization algorithm, which is usually based on redundant modulo representation.

Other scalar multiplication methods have been proposed. For example, the method disclosed in the U.S. Published Patent Application No. 2001/0048741, entitled "METHOD OF CALCULATING MULTIPLICATION BY SCALARS ON AN ELLIPTIC CURVE AND APPARATUS USING SAME AND RECORDING MEDIUM" is based upon judging the value of a bit of a scalar value, randomizing the calculation order of addition and doubling operations and then execute the randomized double and add operations. However, this methodology is weak against address-bit attack.

The method disclosed in the U.S. Published Patent Application No. 2003/0059042, entitled "ELLIPTIC SCALAR MULTIPLICATION SYSTEM", provides scalar multiplication where operations are carried out upon a randomized point in a scalar multiplication method to calculate the scalar-multiplied point from a scalar value and a point on an elliptic curve. Calculating the scalar multiplication may include a step of carrying out an operation upon each bit of the scalar value resulting in a vulnerability to the ABA.

Securing the scalar multiplication algorithm against side channel attacks (SPA and DPA) does not mean protecting the algorithm against address bit attack. Therefore, there is a need for an algorithm with countermeasures against side channel attacks as well as address bit attack.

The ABA attack is based on the correlation between bit values of the scalar, K, and the location (address) of the variables (registers) used in a scalar multiplication algorithm. This type of attack can be based on monitoring operands (source) registers and/or destination registers of ADD and/or DBL operations. Therefore, correlation between accessing source registers and the scalar bit value can occur while reading from these registers. Similarly, correlation between accessing destination registers and the scalar bit value can occur while writing to these registers.

In ADD operations, there is no problem in accessing the source registers, since both operands will be read independently of the scalar bit value. However, in BDL operations, one of the source registers should be selected based on the scalar bit value in order to get the correct result of the scalar multiplication, KP. Therefore, this selection process correlates the scalar bit value to accessing one of these registers, as shown by step 5 in the ML binary algorithm, step 5 in the LM binary algorithm and step 3 in Takagi's algorithm (all given above).

The location of where to store the result of ADD and DBL operations can also be correlated to the scalar bit value as shown by the 2-registers version of Takagi's algorithm, given below:

```
for i = n-2 downto 0
{
    Q[1-k_i] = ADD (Q[0], Q[1])
    Q[k_i] = DBL(Q[k_i])
}.
```

None of the above inventions, patents and published patent applications, taken either singly or in combination, is seen to describe the instant invention as claimed. Thus, a system and method for performing iterative scalar multiplication which is protected against address bit attack solving the aforementioned problems is desired.

SUMMARY OF THE INVENTION

The system and method for performing iterative scalar multiplication which is protected against address bit attack is provides a methodology, and system for implementing the methodology, for performing an iterative scalar multiplication process utilizing the Takagi algorithm, the most-to-least binary algorithm, or the least-to-most binary algorithm, modified with either a simultaneous register access operation (SRA) or a general simultaneous register access operation (GSRA). Further, a level-based randomization scheme may be added to provide further security to the algorithms. One basic method, based upon the Takagi algorithm (to be described in detail below) follows the following methodology and implementation:

(1) provide an arithmetic processing unit, first, second, third and fourth registers, and first, second, third and fourth multiplexers;

(2) define point values Q[0], Q[1], Q[2] and Q[3] held in the first, second, third and fourth registers, respectively, and further define initial point values P and 2P, (3) set Q[2] equal to P and Q[3] equal to 2P, (4) establish a control selection line in communication with the first and second multiplexers, and further establish a current scalar bit value $k_i$, and feed $k_i$ to the first multiplexer through the control selection line, and feed $1-k_i$ to the second multiplexer through the control selection line;

(5) starting from the next most significant bit, repeat the following steps (6) through (10) until all bits of the scalar are processed;

(6) perform the two following simultaneous register access operations:

(i) a first simultaneous register access operation to establish the operand of a doubling operation, which is also the operand of an addition operation in the first register;

(ii) a second simultaneous register access operation to establish the second operand of an addition operation in the second register;

(7) store the result of the doubling operation in the third register;

(8) store the result of the addition operation in the fourth register;

(9) perform the following two simultaneous register access operations:

(i) a first simultaneous register access operation to transfer the result of either the doubling operation (stored in the third register) or the addition operation (stored in the fourth register) to the first register;

(ii) a second simultaneous register access operation to transfer the other register (either the third or fourth register, correspondingly) to the second register;

(10) in parallel, transfer the contents of the first register to the third register and the contents of the second register to the fourth register independently from the scalar bit value.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed towards a system and method for performing iterative scalar multiplication which is protected against address bit attack (ABA). The system and method prevents ABA by accessing all registers simultaneously to mask the addresses' correlation between operand/destination addresses and the scalar bit value. This kind of correlation can exist between the scalar bit value, and the addresses of operand registers and/or destination registers of the Elliptic Curve (EC) basic operations.

Simultaneous access of registers is used to access the operand registers (during the reading operands phase) and the destination registers (during the writing results phase); i.e., the process of accessing all registers simultaneously is used to replace the access of specific registers (as an operand source or a destination of a result), and where the corresponding addresses of these specific registers are correlated with the value of the bits of a scalar. It should be noted that different scalar multiplication algorithms can have correlation between the scalar bit value and either the address of operand registers, the address of destination registers, or with both.

As will be described in greater detail below, "simultaneous register access" (SRA) is a methodology for masking the addresses' correlation between operand/destination addresses and the scalar bit value by simultaneous accessing of all operand registers in the case of operand reading, and all destination registers in the case of results writing. This includes not only the operand and destination registers of EC basic operations but also the register transfer operations that are correlated to the scalar bit value such as steps 5 and 6 of Takagi's algorithm (shown above).

Figure 6:
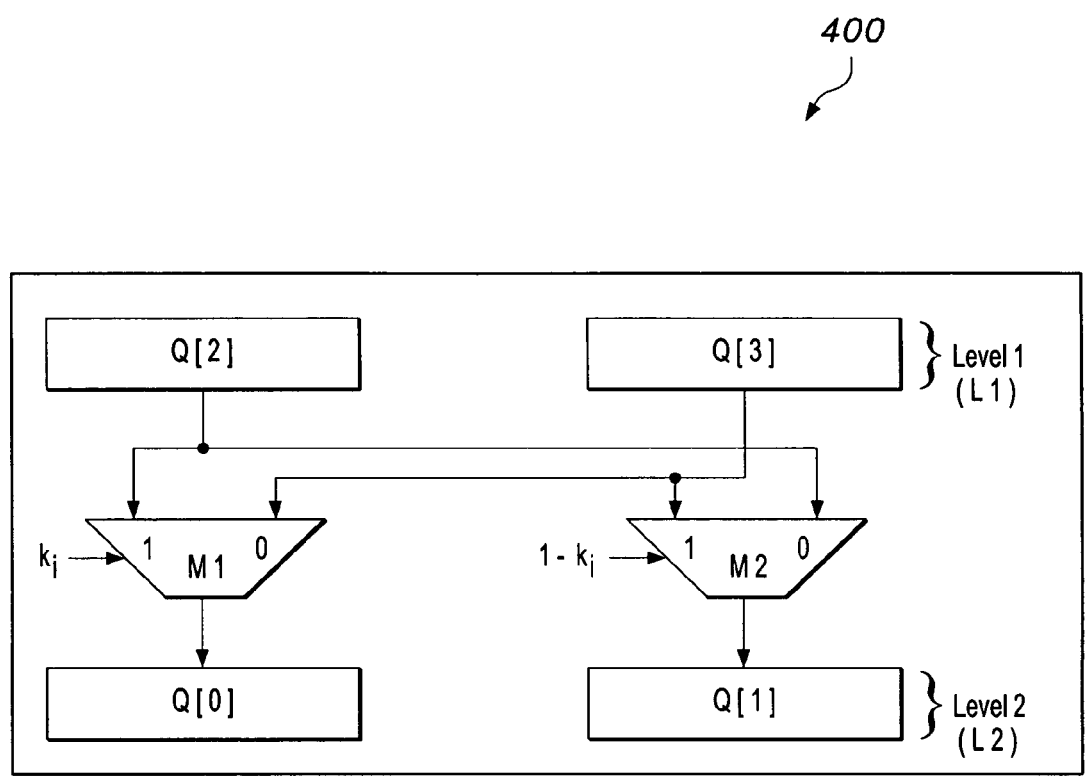
FIG. 6 is a block diagram of the system for performing iterative scalar multiplication which is protected against address bit attack according to the present invention.

In the SRA methodology, two levels of registers are used; these levels are labeled in FIG. 6 as "Level 1" (L1) and "Level 2" (L2). An operation in the SRA methodology 400 (shown in FIG. 6), transfers the contents of L1 registers to L2 registers in a way that guarantees reading from all registers in L1 and writing to (loading) all registers in L2 simultaneously in one cycle. The basic principle of the SRA method 400 is as follows:

1. the values (points) computed by EC basic operations are always stored in specific L1 registers regardless of the scalar bit value;

2. since the scalar bit value is used to select one of the possible values in L1 registers as an operand for the next EC basic operation, which is the source of the correlation used in address bit attack, an SRA operation is used to transfer the contents of all L1 registers to all L2 registers simultaneously in order to mask the address correlation with the scalar bit value; and, 3. the appropriate values of the next EC basic operation is read from specific L2 registers regardless of the scalar bit value.

Therefore, the SRA methodology solves the correlation between registers addresses and scalar bit value by the simultaneous transfer of the contents of all L1 registers to L2 registers.

It is significant to note that the time interval for adding an SRA operation is, essentially, one cycle, which is relatively negligible when compared with the number of cycles needed to perform EC basic operations.

In the SRA block 400 of FIG. 6, the L1 registers are set to Q[2] and Q[3], and the L2 registers are set to Q[0] and Q[1]. The $k_i$ scalar bit value, $k_i$, is fed to multiplexer M1 as a control selection line, and its complement, $1-k_i$, is fed to multiplexer M2. The L1 registers are connected to the ports of the two multiplexers M1, M2 in a reverse manner; i.e., Q[2] is connected to port 0 of M1 and to port 1 of M2, and Q[3] is connected to port 1 of M1 and to port 0 of M2. Thus, access is possible for both L1 registers for Q[2] and Q[3] by a read operation, and both L2 registers for Q[0] and Q[1] by a write operation, in both cases, when $k_i=0$ and $k_i=1$.

The SRA operation can be used to mask the correlation between the addresses of the operand registers and the scalar bit value by plugging an SRA block (such as SRA block 400) before the EC basic operations (i.e., ADD and DBL operations). This SRA operation is referred to, hereinafter, as "Operand-SRA". Similarly, the SRA operation can be used to mask the correlation between the addresses of the destination registers (where the results of EC basic operations are stored) and the scalar bit value by plugging an SRA block after the EC basic operations. This SRA operation is referred to, hereinafter, as "Result-SRA". In one scalar multiplication operation, the Operand-SRA may be transformed, via the elliptic curve basic operations, into the Result-SRA.

In the case of reading of operands, the input to Operand-SRA is stored in the L1 registers. This input is generated and stored in the L1 registers by the previous iteration, or as initial values if it is the first iteration. Then, two parallel register transfer operations take place to load the L2 registers by the L1 registers. The first operation is for preparing the appropriate operand for a DBL operation in Q[0], which is also the first operand of the ADD operation, and the other is to load Q[1] with the second operand of the ADD operation. Both operations are performed in one cycle.

In the case of writing results of EC basic operations, the input to Result-SRA is stored in the L1 registers. This input is generated and stored in the L1 registers by the EC basic operations (which may be performed by any suitable arithmetic and logic unit, or "ALU"). Then, two parallel register transfer operations take place to load the L2 registers by the L1 registers. The first operation stores the result of the DBL operation in its appropriate register of L2, and the second operation stores the result of the ADD operation in its appropriate register of L2 (based on the algorithm used). Both register transfer operations are performed in one cycle.

Since the results of the current iteration are stored in the L2 registers and these results will be used as input operands for the next iteration, one final SRA operation is required to transfer the L2 registers to the L1 registers independently of the scalar bit value.

Although both the Operand-SRA and Result-SRA operations can be used together in one scalar multiplication iteration, it is more convenient to use only one SRA block that can perform the job of both Operand-SRA and Result-SRA. Both the reading of operands and the writing of results, in this case, are described below.

For reading of the operands, the input to the SRA block is stored in the L1 registers. This input is generated and stored in the L1 registers by the previous iteration, or as initial values if it is the first iteration. Then, two parallel register transfer operations take place to load the L2 registers by the L1 registers. The first operation is for preparing the appropriate operand for the DBL operation in Q[0], which is also the first operand of the ADD operation, and the second operation loads Q[1] with the second operand of the ADD operation. At this point, the operands of the EC basic operations are prepared in the L2 registers, and the L1 registers are prepared to receive the results of the EC basic operations. After this, the EC basic operations are performed on their operands stored in the L2 registers.

For the writing of results, the results of the EC basic operations are computed (by the ALU) and stored in the L1 registers in a fixed manner independently of the scalar bit value and the L2 registers are prepared for loading. These results (stored in L1) should be prepared for the next iteration based on the scalar bit value. Thus, the SRA operation is used to load the L2 registers by the L1 registers, and two parallel register transfer operations take place. The first operation stores the result of the DBL operation in its appropriate L2 register, and the second operation stores the result of the ADD operation in its appropriate L2 register (based on the algorithm used). By the end of this process, the correct and ordered results of the DBL and ADD operations are stored in the L2 registers.

Since the results of the current iteration are stored in the L2 registers, and these results will be used as input operands for the next iteration, one final SRA operation is required to transfer the L2 registers to the L1 registers independently of the scalar bit value.

A general version of the simultaneous register access method, referred to hereinafter as "General Simultaneous Register Access" (GSRA), is constructed by using four 4-1 multiplexers that allow transferring the content of any register to any register, as shown in the GSRA block 10 in FIG. 1. The GSRA method preserves the property of using two levels of registers (L1 and L2) and the property of removing address-to-scalar bit value correlation by means of accessing all L1 registers by read operations, and accessing all L2 registers by write operations.

In the GSRA method, each register is connected to the port corresponding to its index in all multiplexers; i.e., Q[0] is connected to port 0 in multiplexers M1, M2 and M3; Q[1] is connected to port 1 in multiplexers M0, M2 and M3; Q[2] is connected to port 2 in multiplexers M0, M1 and M3; and Q[3] is connected to port 3 in multiplexers M0, M1 and M2. The output of the ALU is connected to the remaining fourth port in each multiplexer; i.e., ALU output is connected to the port in which the index is equal to the index of the register. In other words, the ALU output is connected to ports 0, 1, 2, and 3 of M0, M1, M2, and M3, respectively.

Since each register in the GSRA method can be transferred to any other register, there are several choices for L1 and L2 register assignments. In particular, there are 4×3×2×1=24 different possible assignments for the L1 and L2 registers, since the first register in L1 has four possible choices (Q[0], Q[1], Q[2] or Q[3]), the second has three possible choices, the first register in L2 has two choices, and the second has one choice. These assignments can be exploited to randomize L1 and the L1 registers in order to add more protection to the algorithms against ABA, as will be described in greater detail below.

Further, the least to most (LM) binary scalar multiplication algorithm, which requires reading from the L1 registers (not from the L2 registers as in similar algorithms), and writing to the L2 registers (not to the L1 registers, as in similar algorithms) can be protected against ABA by using the GSRA method, as will be further described in greater detail below.

Figure 1:
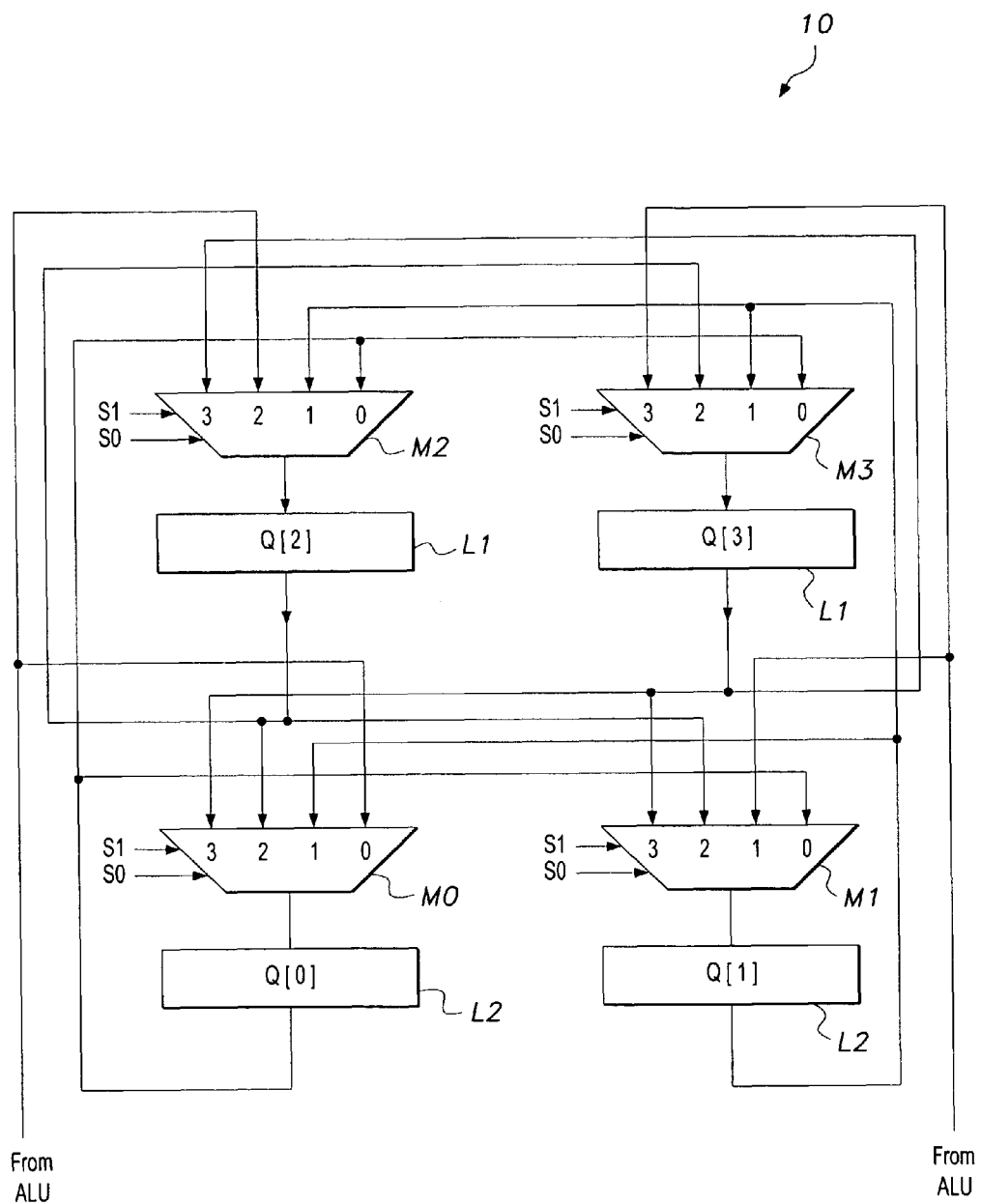
FIG. 1 is a block diagram of a system for performing iterative scalar multiplication which is protected against address bit attack according to the present invention.

Though illustrated as utilizing four registers L1, L2 in FIG. 1, it should be understood that fewer registers may be utilized. However, in order to avoid reloading a register with its previous value that causes no gate switching, four registers are utilized in the preferred embodiment.

As discussed above, Takagi's algorithm is vulnerable to address bit attack. Particularly, Takagi's algorithm is vulnerable to ABA in reading the operand of DBL operations (in step 3 of Takagi's algorithm), and in the register transfer operations after the ADD operation in steps 5 and 6. This algorithm can be enhanced by using the SRA method, described above. To protect this algorithm against ABA, an SRA operation should be used before the DBL operation (i.e., before step 3) and another SRA operation should be used after the ADD operation to replace step 5 and 6. The enhanced Takagi's algorithm is given below:

```
INPUT      K, P
OUTPUT     KP
1. Initialize Q[2] = P, Q[3] = 2P
    for i = n−2 down to 0
        2. In parallel: Q[0] = Q[2+ k_i];    Q[1] = Q[3− k_i].
        3. Q[2] = DBL(Q[0])
        4. Q[3] = ADD(Q[0], Q[1])
        5. In parallel: Q[0] = Q[2+ k_i];    Q[1] = Q[3− k_i].
        6. In parallel: Q[2] = Q[0];         Q[3] = Q[1]
    end for
        return Q[0]
```

In the above enhanced Takagi's algorithm, the DBL operation has fixed operand and destination registers which are independent of the scalar bit value. The correlation in the original algorithm between the operand of the DBL operation and the scalar bit value is masked by the SRA operation in step 2 of the above. Further, the correlation in the original algorithm in register transfer operations in steps 5 and 6 is masked by the SRA operation in step 5 of the above.

The steps of the enhanced Takagi's algorithm (given above) are further described below, in a step-by-step fashion:

Step 1: Initialize L1 registers: Q[2] to P and Q[3] to 2P.

Step 2: Transfer the operands of the DBL and ADD operations from the L1 registers to the L2 registers based on the scalar bit value. This is achieved by utilizing an SRA operation which performs the following: if $k_i$ is 0, the operation loads Q[2] to Q[0] and Q[3] to Q[1], otherwise (i.e., for $k_i=1$) the operation loads Q[2] to Q[1] and Q[3] to Q[0]. Thus, the operand of the DBL operation, which is also the first operand of the ADD operation, is stored in Q[0]. By the same SRA operation, the second operand of the ADD operation is stored in Q[1]. It should be noted that this step is performed by using an SRA operation which has the property of accessing the L1 registers simultaneously and loads the L2 registers simultaneously, making it difficult to build a correlation between the scalar bit values and accessing any of these registers. In other words, all L1 registers are read from, and all L2 registers are written to, in both cases when the scalar bit value is 0 or 1. As a result, the operand of the DBL operation is Q[0] independently of the scalar bit value and the operands of the ADD operation are Q[0] and Q[1] independently of the scalar bit value.

Step 3: The DBL operation doubles the point value in Q[0] and stores the result in Q[2] independently of the scalar bit value.

Step 4: The ADD operation adds the point value in Q[0] to the point value in Q[1] and stores the result in Q[3] independently of the scalar bit value.

Step 5: This SRA operation is applied following performance of both the DBL and the ADD operations. The result of the DBL operation is stored in Q[2] and the result of the ADD operation is stored in Q[3]. These results need to be transferred to Q[0] and Q[1], respectively, based on the scalar bit value. This is achieved by using an SRA operation that performs the following: if $k_i$ is 0, it loads Q[2] (the result of DBL) to Q[0] and Q[3] (the result of the ADD operation) to Q[1]. Otherwise (i.e., for $k_i=1$) it loads Q[2] (result of the DBL operation) to Q[1] and Q[3] (result of the ADD operation) to Q[0]. By the end of this step, the DBL and ADD results of the current iteration of the scalar multiplication are stored in the L2 registers.

Step 6: Since the results of the DBL and ADD operations of the current iteration are stored in the L2 registers, and these results will be used as an input to the next iteration, the L2 registers must be transferred to the L1 registers regardless of the scalar bit values. This is achieved by using an SRA operation that transfers the contents of Q[0] to Q[2] and Q[1] to Q[3] independently of the scalar bit value. In this way, the input to the next iteration is prepared in the L1 registers, and flow is returned to step 2.

Table 2 shows an example of how the above enhanced Takagi's algorithm computes 53P (i.e., K=53). The scalar, K, is represented in binary representation in the first row. Each step of the algorithm is shown separately. Each column from the fourth column down to the last column represents a scalar multiplication iteration.

TABLE 2

An example of how the enhanced Takagi's algorithm computes 53P

|  |  | 1 | 1 | 0 | 1 | 0 | 1 |
|---|---|---|---|---|---|---|---|
|  | K |  |  |  |  |  |  |
| Step 1 | Q[2] | 1 |  |  |  |  |  |
|  | Q[3] | 2 |  |  |  |  |  |
| Step 2 | Q[0] |  | 2 | 3 | 7 | 13 | 27 |
|  | Q[1] |  | 1 | 4 | 6 | 14 | 26 |
| Step 3 | Q[2] |  | 4 | 6 | 14 | 26 | 54 |
| Step 4 | Q[3] |  | 3 | 7 | 13 | 27 | 53 |
| Step 5 | Q[0] |  | 3 | 6 | 13 | 26 | <u>53</u> |
|  | Q[1] |  | 4 | 7 | 14 | 27 | 54 |
| Step 6 | Q[2] |  | 3 | 6 | 13 | 26 | 53 |
|  | Q[3] |  | 4 | 7 | 14 | 27 | 54 |

Figure 2:
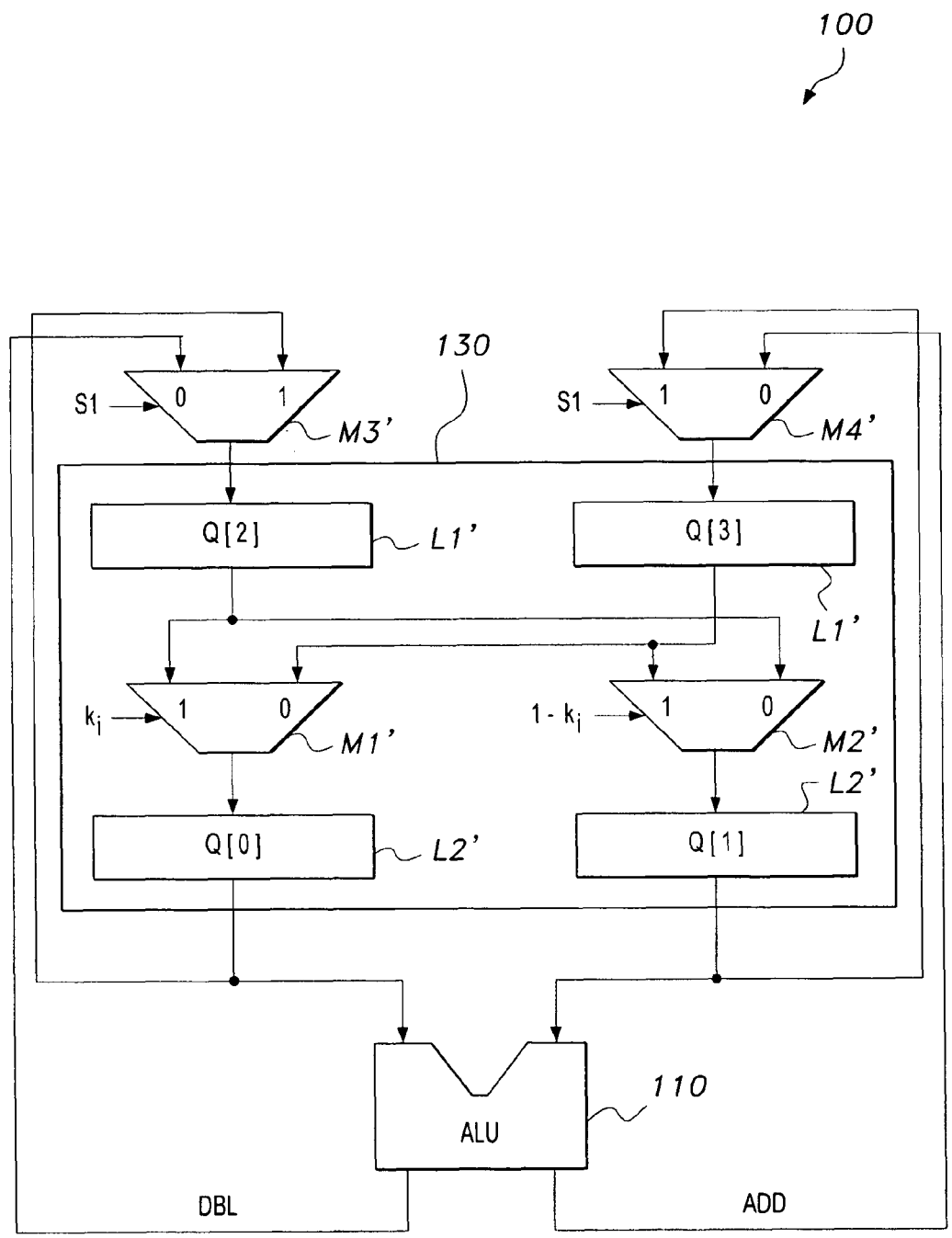
FIG. 2 is a block diagram of an alternative embodiment of a system for performing iterative scalar multiplication which is protected against address bit attack according to the present invention.

The above enhanced Takagi's algorithm can be implemented using one arithmetic processing unit (ALU 110 in FIG. 2) that performs the DBL and ADD operations in a sequential manner, as shown in FIG. 2. In exemplary system 100, operations are performed in the following fixed order: SRA→DBL→ADD→SRA→SRA in all iterations, with 130 being the SRA block, L1' and L2' representing the registers, and M1' and M2' being the multiplexers.

Preferably, ALU 110 is an N-bit arithmetic unit, registers L1' and L2' are N-bit registers, and M1' and M2' are 2-1-multiplexers, where N is the underlying field size. Multiplexers M1' and M2' are shown for simplified exemplary purposes only. Preferably, 4N multiplexers are provided, where N is the underlying field size. This implementation can be summarized in the following:

The initial values (points) P and 2P are stored in Q[2] and Q[3], respectively.

The current scalar bit value, $k_i$, is fed as a control selection line to multiplexer M1 and its complement to multiplexer M2.

The operand of the DBL operation is prepared in Q[0] by an SRA operation as mentioned in the explanation of Step 2 above.

The operands of the ADD operation are prepared in Q[0] and Q[1] by an SRA operation, as mentioned in the explanation of Step 2 above.

Result of the DBL operation is stored in Q[2] regardless of the scalar bit value.

Result of the ADD operation is stored in Q[3] regardless of the scalar bit value.

Results of the DBL and ADD operations of the current iteration of the scalar multiplication are prepared in Q[0] and Q[1] based on the scalar bit value, as mentioned in the explanation of Step 5 above.

Results of the current iteration of the scalar multiplication are transferred to Q[2] and Q[3] to be used as input to the next iteration, as mentioned in the explanation of Step 6 above. To accomplish this task, control selection line S1, is used to select the input to registers Q[2] and Q[3]. If S1=0, the output of the ALU is selected as input to Q[2] and Q[3] regardless of the scalar bit value. If S1=1, Q[0] is selected as input to Q[2] and Q[1] is selected as input to Q[3] regardless of the operation being performed and the scalar bit value. The connections between Q[0] and Q[2], and Q[1] and Q[3] are presented for this purpose (i.e., to be used by Step 6 above).

As discussed above, the binary most to least (ML) algorithm suffers from address bit attack. It suffers from the address bit attack in the register transfer operation in Step 5. The result of this register transfer operation is stored in Q[2] which is used as an input operand of the DBL operation in the next iteration. Therefore, this algorithm suffers from the ABA in preparing the input operand of the DBL operation.

To protect this algorithm against ABA, the register transfer operation in Step 5 of the original ML algorithm should be replaced by an SRA operation that can prepare the operand of the DBL operation of the next iteration without exhibiting the aforementioned correlation. The enhanced ML binary algorithm is shown below:

```
INPUT      K, P
OUTPUT     KP
    1. Initialize Q[0] = P
       for i = n-2 down to 0
    2. Q[2] = DBL(Q[0]);      Q[3] = P
    3. In parallel: Q[0] = Q[2];   Q[1] = Q[3].
    4. Q[3] = ADD(Q[0], Q[1])
    5. In parallel: Q[0] = Q[2+ k_i];   Q[1] = Q[3- k_i].
    end for
    return Q[0]
```

In addition to using an SRA operation in Step 5 in the above enhanced ML binary algorithm, another SRA operation is used in Step 3 in order to prepare the operands of the ADD operation where one of them is the result of the DBL operation (Step 2) in the same iteration. However, the conventional binary algorithm is sequential by nature, which means that in each iteration, the result of the DBL operation is used by the ADD operation, and hence there is a data dependency between ADD and DBL operations (i.e., DBL is a producer and ADD is a consumer). When using an SRA block, any ADD or DBL operation stores the result in the L1 registers. In the enhanced ML binary algorithm, the result of the DBL operation (Step 2) is stored in the L1 register, Q[2], which is the first operand of the ADD operation. The second operand of the ADD operation is always the base point P (in all iterations) that is stored in Q[3]. Therefore, before computing the ADD operation, its operands must be transferred from the L1 registers to the L2 registers. This is achieved by using the SRA operation in Step 3 above. It should be noted that this operation is performed independently of the scalar bit value. Also, loading the base point P to Q[3] is preformed independently of the scalar bit value and it is performed in parallel to the DBL operation (Step 2) to save one cycle.

The correlation between the register address and the scalar bit value in Step 5 of the original ML algorithm is replaced by the SRA operation in Step 5 above. Hence, the DBL operation has a fixed operand and destination registers that are independent of the scalar bit value. Further clarification is given in the explanation of Step 5 below.

Steps of the enhanced ML binary algorithm above are summarized as follows:

Step 1: Initializes Q[0] to P.

Step 2: The DBL operation doubles the point in Q[0] and stores the result in Q[2] independently of the scalar bit value. In parallel, the base point P is loaded to Q[3] in order to be used later as the second operand of the ADD operation. However, loading the base point to Q[3] is independent of the scalar bit value and there is no need to mask it by the DBL operation, as it is preformed in parallel to the DBL operation to save one clock cycle. The results of the Step 2 operations are stored in the L1 registers. These results are used as operands of the ADD operation. Therefore, they need to be transferred to the L2 registers and this is the task of Step 3.

Step 3: Transfers the contents of the L1 registers to the L2 registers in order to be used as operands of the ADD operation. This transfer operation is performed in a fixed manner independently of the scalar bit value; i.e., Q[2] is transferred to Q[0] and Q[3] is transferred to Q[1].

Step 4: ADD operation adds the point in Q[0] to the base point P (stored in Q[1] and stores the result in Q[3] independently of the scalar bit value.

Step 5: The SRA operation in this step comes after performing both the DBL and the ADD operations and its main objective is to prepare the operand of the DBL operation of the next iteration in Q[0]. In the current iteration, the result of the DBL operation is generated and stored in Q[2] by Step 2 and the result of the ADD operation is generated and stored in Q[3] by Step 4. One of these results should be prepared in Q[0] as an operand of the DBL operation of the next iteration based on the scalar bit value. This is achieved by using an SRA operation (Step 5) that performs the following: if $k_i$ is 0, it loads Q[2] (result of DBL) to Q[0] and Q[3] (result of ADD) to Q[1]. Otherwise (i.e., for $k_i$=1) it loads Q[2] (result of DBL) to Q[1] and Q[3] (result of ADD) to Q[0]. As a result, the correct point to be doubled in the next iteration is stored in Q[0]. It should be noted that the content of Q[1] after this SRA operation is useless and it will be replaced by the base point in Step 3 in the next iteration.

The below Table 3 shows an example of how the enhanced ML binary algorithm computes 53P (i.e., K=53). The scalar, K, is represented in the binary representation in the first row. Each step of the algorithm is shown separately. Each column starting from the fourth (from the left) column down to the last column represents a scalar multiplication iteration.

TABLE 3

An example of how the enhanced ML binary algorithm computes 53P

|  |  | K ( | 1 | 1 | 0 | 1 | 0 | 1 |
|---|---|---|---|---|---|---|---|---|
| Step 1 | Q[0] | 1 |  |  |  |  |  |  |
|  | Q[2] | 1 |  |  |  |  |  |  |
|  | Q[3] | 1 |  |  |  |  |  |  |
| Step 2 | Q[2] |  |  | 2 | 6 | 12 | 26 | 52 |
|  | Q[3] |  |  | 1 | 1 | 1 | 1 | 1 |
| Step 3 | Q[0] |  |  | 2 | 6 | 12 | 26 | 52 |
|  | Q[1] |  |  | 1 | 1 | 1 | 1 | 1 |
| Step 4 | Q[3] |  |  | 3 | 7 | 13 | 27 | 53 |
| Step 5 | Q[0] |  |  | 3 | 6 | 13 | 26 | 53 |
|  | Q[1] |  |  | 1 | 6 | 1 | 26 | 1 |

Figure 3:
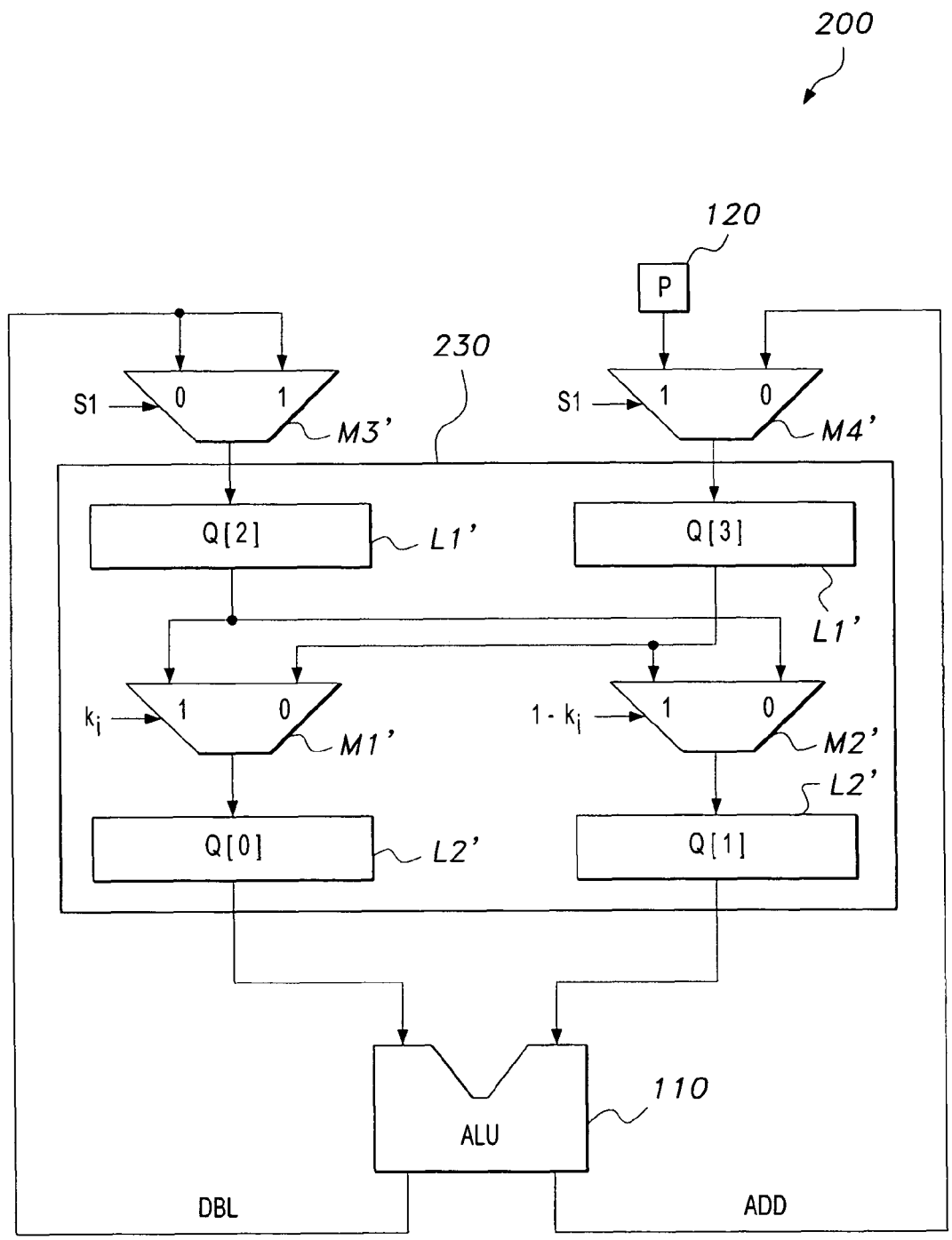
FIG. 3 is a block diagram of an alternative embodiment of a system for performing iterative scalar multiplication which is protected against address bit attack according to the present invention.

The enhanced ML binary algorithm can be implemented using one arithmetic processing unit that performs the DBL and ADD operations in a sequential manner, as shown in system 200 of FIG. 3. In this implementation, operations are performed in the following fixed order: DBL→SRA→ADD→SRA in all iterations. The required basic components are: one N-bit arithmetic unit, 4 N-bit registers and 4×N 2-1-multiplexers, where N is the underlying field size, as above with reference to FIG. 2. This implementation can be summarized in the following:

The initial value (point) P is stored in Q[0].

The current scalar bit value, $k_i$, is fed as a control selection line to multiplexer M1 and its complement to multiplexer M2.

The DBL operation doubles the point in Q[0] and stores the result in Q[2] independently of the scalar bit value. Note that multiplexer M3 can be eliminated since the result of DBL operation is always stored in Q[2] and no other option can be loaded to Q[2]. However, it is included for the sake of modularity and symmetry.

In parallel to the DBL operation (Step 2), the base point P is loaded to Q[3] in order to be used later as the second operand of the ADD operation. Control selection line, S1, is used to control loading of the base point to Q[3]. When S1=1, the base point is selected to be loaded to Q[3], otherwise, (i.e., when S1=0), the result of the ADD operation (or output of the ALU) is selected. Although, loading the base point to Q[3] is independent of the scalar bit value and no need to mask it by the DBL operation, it is preformed in parallel to the DBL operation to save one clock cycle. This can be done any time during the DBL operation since it needs only one clock cycle and the DBL operation requires several clock cycles to perform the modular arithmetic operations.

Results of operations in Step 2 are stored in the L1 registers. These results are used as operands of the ADD operation. Therefore, they need to be transferred to the L2 registers and this is the task of Step 3. As described earlier, the addition of Step 3 in the enhanced ML binary algorithm is because of the sequential nature of the conventional binary algorithm which means that in each iteration, the result of the DBL operation is used by the ADD operation, and hence there is a data dependency between ADD and DBL operations (i.e., DBL is a producer and ADD is a consumer).

The operands of the ADD operation are prepared in Q[0] and Q[1] by the SRA operation in Step 3.

Result of the ADD operation is stored in Q[3] regardless of the scalar bit value.

Results of the DBL and ADD operations of the current iteration of the scalar multiplication are stored in Q[2] and Q[3] respectively. One of these results need to be prepared in Q[0] as an operand of the DBL operation of the next iteration based on the scalar bit value. This is achieved by using the SRA operation shown in Step 5.

As discussed above, the binary least to most (LM) binary algorithm also suffers from address bit attack in the register transfer operation in Step 5. This step updates register Q[1] either by its previous value (remaining unchanged) or by the result of the ADD operation stored in Q[2]. The contents of the register Q[1] in the current scalar multiplication iteration is used as an input operand of the ADD operation in the next iteration. Therefore, a correlation exists between the address of the register to be loaded to Q[1] and the scalar bit value, which is used to select the input operand of the ADD operation.

To protect this algorithm against ABA, the register transfer operation in Step 5 of the original algorithm should be replaced by an SRA operation which can prepare the operand of the ADD operation of the next iteration safely. The enhanced LM binary algorithm is shown below:

```
INPUT       K, P
OUTPUT      KP
    1. Initialize Q[1] = P; Q[2] = P
        for i = 1 to n−1
    2. Q[0] = DBL(Q[2])
    3. Q[3] = ADD(Q[0], Q[1])
    4. Q[2] = Q[1]
    5. In parallel: Q[1] = Q[2+ k_i];    Q[0] = Q[3− k_i];
        Q[2] = Q[0]
        end for
        return Q[1]
```

It is important to note that this algorithm differs from the previous algorithms in the sense that it requires reading from the L1 registers (not from the L2 registers as in the other above algorithms) and writing to the L2 registers (not to the L1 registers like the other above algorithms) and, hence, it requires using the general simultaneous register access (GSRA) operation. However, SRA operations can be performed by using a GSRA block.

By the end of each iteration of the original LM algorithm, the result of the previous iteration of the algorithm (corresponding to the previously traversed bits of the scalar) is stored in Q[1]. The correlation in Step 5 of the original algorithm is caused by the dependency on the scalar bit value to select either the result of the ADD operation in the current iteration stored, which is stored in Q[2], or the result of the previous iteration, which is stored in Q[1]. In the enhanced LM binary algorithm above, the result of the ADD operation in the current iteration is stored in Q[3] and the result of the previous iteration is stored in Q[1]. One of these points (i.e., Q[3] or Q[1]) should be selected based on the scalar bit value. The GSRA method solves this correlation by means of accessing all L1 registers by a read operation and accessing all L2 registers by a load operation as shown below:

The result of the ADD operation in the current iteration is stored in the L1 register Q[3] (Step 3).

The result of the previous iteration is stored in the L2 register Q[1].

The possible values (points) to be selected from are the result of the ADD operation in the current iteration (stored in Q[3]) and the result of the previous iteration (stored in Q[1]. These two values should be stored in the L1 registers in order to be used by the GSRA operation shown in Step 5. Since the result of the ADD operation is stored in Q[3], which is a member of the L1 registers, we need only store the result of the previous iteration in Q[2], as shown in Step 4.

After that, a GSRA operation is performed and two register transfer operations take place as follows: if $k_i$ is 0, Q[2] (result of the previous iteration) is loaded to Q[1] and Q[3] (result of the ADD operation in the current iteration) is loaded to Q[0]. Otherwise (i.e., for $k_i$=1), Q[2] (result of the previous iteration) is loaded to Q[0] and Q[3] (result of the ADD operation in the current iteration) is loaded to Q[1]. As a result, the correct result of the algorithm in the current iteration is stored in Q[1] with accessing all L1 registers and all L2 registers.

The steps of the enhanced ML binary algorithm shown above are summarized in the following:

Step 1: Initializes Q[1] and Q[2] to P.

Step 2: The DBL operation doubles the point in Q[2] and stores the result in Q[0]. Note that in this algorithm, the DBL operation works independently of the scalar bit value and it has a fixed operand register, Q[2], and a fixed destination register, Q[0].

Step 3: ADD operation adds the point in Q[0] (result of the DBL operation) to the point in Q[1] (result of the previous iteration) and stores the result in Q[3] independently of the scalar bit value.

Step 4: Transfers the contents of Q[1] to Q[2] in order to get the L1 registers ready with the possible values that we have to select one of them based on the scalar bit value.

Step 5: This GSRA operation comes after performing both the DBL and the ADD operations and it performs three parallel register transfer operations. Note that performing three parallel register transfer operations is not possible by using an SRA operation and hence the GSRA operation is used instead. The main objective of Step 5 is to load Q[1] either by the result of the ADD operation in the current iteration stored in Q[3] or by the result of the previous iteration prepared in Q[2]. This is achieved by using a GSRA operation that performs the following: if $k_i$ is 0, Q[2] (result of the previous iteration) is loaded to Q[1] and Q[3] (result of the ADD operation in the current iteration) is loaded to Q[0]. Otherwise (i.e., for $k_i$=1), Q[2] (result of the previous iteration) is loaded to Q[0] and Q[3] (result of the ADD operation in the current iteration) is loaded to Q[1]. In parallel to this, a third operation that transfers the contents of Q[0] (result of the DBL operation) to Q[2] is performed in order to double Q[2] in the next iteration (i.e., by Step 2). All of these operations are performed by using the GSRA operation that allows loading one of the L2 registers to one of the L1 registers. However, it is worth mentioning that it is possible to read from and write to the same register in one cycle.

Table 4 below shows an example of how the enhanced LM binary algorithm computes 53P. The scalar, K, is represented in the binary representation in the first row. Each step of the algorithm is shown separately. Each column starting from the fourth (from the right) column up to the last column (most left) represents a scalar multiplication iteration.

TABLE 4

An example of how the enhanced LM binary algorithm computes 53P

| 1 | 1 | 0 | 1 | 0 | 1 | (K |  |
|---|---|---|---|---|---|---|---|
|   |   |   |   |   | 1 | Q[1] | Step 1 |
|   |   |   |   |   | 1 | Q[2] |  |
| 32 | 16 | 8 | 4 | 2 |   | Q[0] | Step 2 |
| 53 | 21 | 13 | 5 | 3 |   | Q[3] | Step 3 |
| 21 | 5 | 5 | 1 | 1 |   | Q[2] | Step 4 |
| 53 | 21 | 5 | 5 | 1 | 1 | Q[1] | Step 5 |
| 21 | 5 | 13 | 1 | 3 |   | Q[0] |  |
| 32 | 16 | 8 | 4 | 2 | 1 | Q[2] |  |

Figure 4:
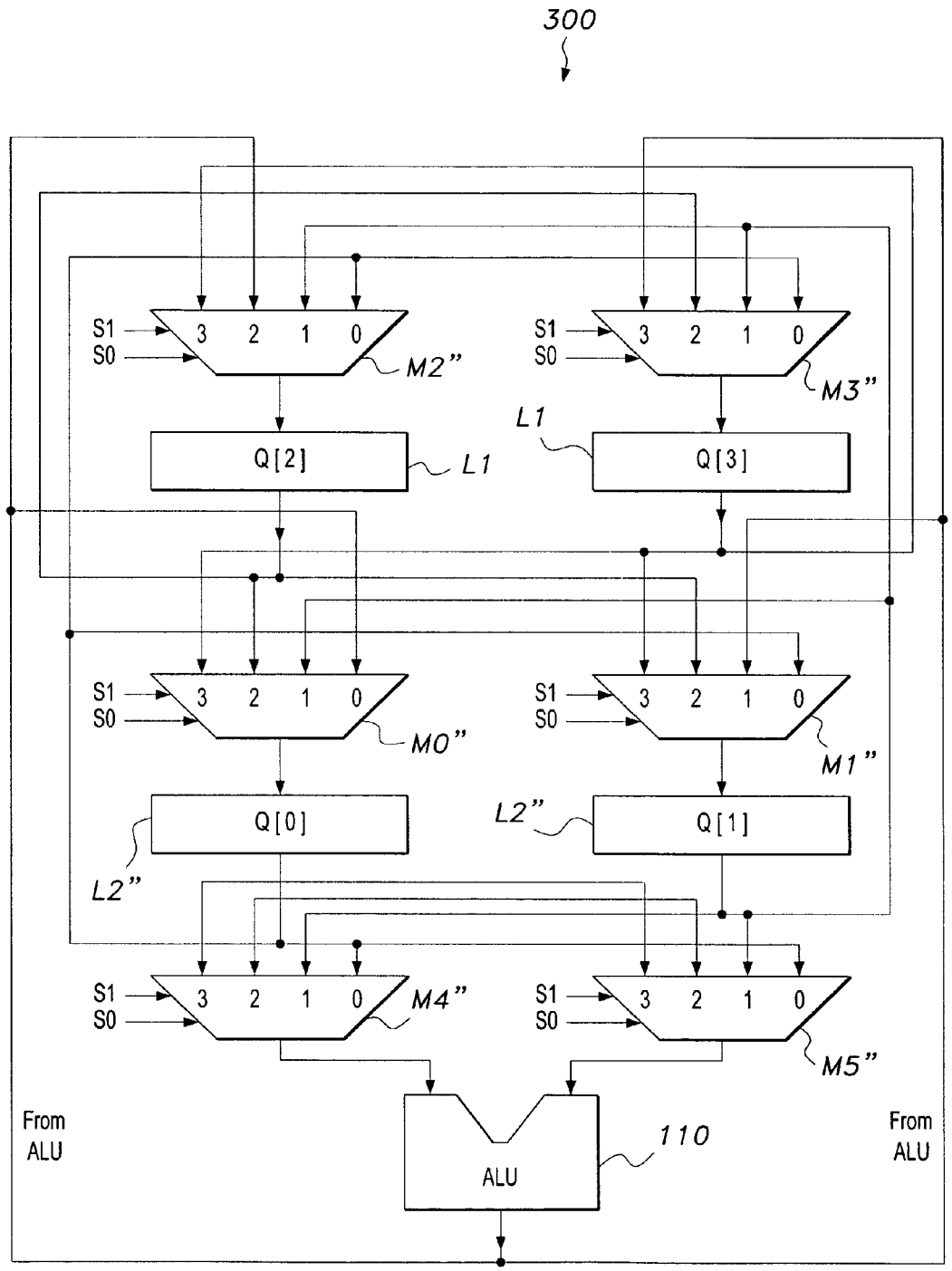
FIG. 4 is a block diagram of an alternative embodiment of a system for performing iterative scalar multiplication which is protected against address bit attack according to the present invention.
Figure 5A:
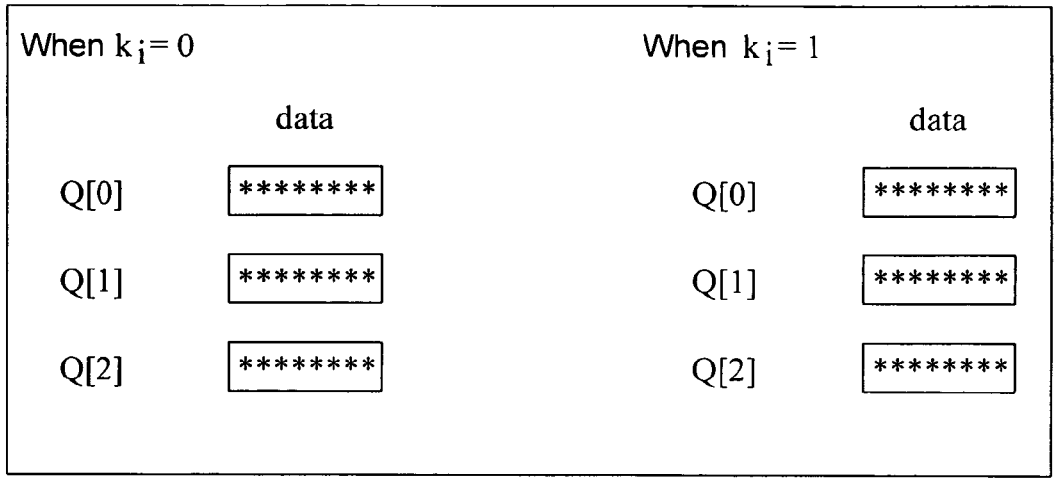
FIG. 5A is a block diagram of a prior art methodology.
Figure 5B:
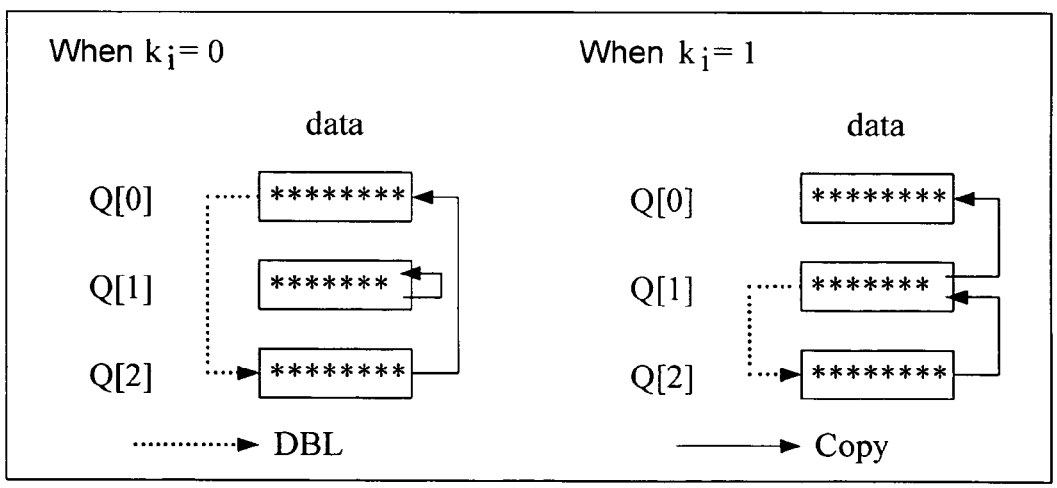
FIG. 5B is a block diagram of a prior art methodology.

The enhanced LM binary algorithm can be implemented using one arithmetic processing unit (ALU 110 in system 300 of FIG. 4) in a sequential manner, as shown in FIG. 4. In this implementation, operations are performed in the following fixed order: DBL→ADD→GSRA in all iterations. This implementation requires one N-bit arithmetic unit (ALU 110), 4 N-bit registers (L1, L2") and 4×N 4-1-multiplexers (M0", M1", M2" and M3"), where N is the underlying field size. Additional 2×N 4-1 multiplexers (M4" and M5") are required to connect the four registers to each port of the ALU. This implementation can be summarized in the following:

The initial value (point) P is stored in Q[1] and Q[2].

For each step of the algorithm, there are specific values of the control selection lines of each multiplexer that going to be used in that step. Table 5 summarizes these values for all steps. Note that these values are independent of the scalar bit value, except Step 5, which is the step that performs the GSRA operation. In Step 5, the current scalar bit value, $k_i$, is fed as S0 control selection of multiplexer M1" and its complement as S0 control selection line of multiplexer M2". The relationship between the S0S1 patterns for multiplexers M1" and M2" and the possible values of the scalar bit is explained below:

1. When $k_i$=0, the S0S1 pattern of multiplexer M1" is 10 (i.e., selecting input port 2) and of multiplexer M0" is 11 (i.e., selecting input port 3).
2. When $k_i$=1, the S0S1 pattern of multiplexer M1" is 11 (i.e., selecting input port 3) and of multiplexer M0" is 10 (i.e. selecting input port 2).

In this way, the GSRA operation guarantees accessing both L1 registers and both L2 registers in both cases when the scalar bit value is 0 and 1.

TABLE 5

Values of the control selection lines of all multiplexers for each step

| Step | Multiplexer | S0 | S1 |
|---|---|---|---|
| Step 2 | M4" | 0 | 0 |
|  | M2" | 1 | 0 |
| Step 3 | M4" | 0 | 0 |
|  | M5" | 0 | 1 |
|  | M3" | 1 | 1 |
| Step 4 | M2" | 0 | 1 |
| Step 5 | M1" | 1 | $k_i$ |
|  | M0" | 1 | $(1 - k_i)$ |
|  | M2" | 0 | 0 |

As discussed above, the GSRA method consists of four registers: Q[0], Q[1], Q[2] and Q[3] Levels L1 and L2 can be associated with these registers in many different ways. In particular, we have 4×3×2×1=24 different possible assignments for the L1 and L2 registers, since the first register in L1 has 4 possible choices (Q[0], Q[1], Q[2] or Q[3], the second has 3 possible choices, the first register in L2 has 2 choices and the second has 1 choice. These assignments can be exploited to randomize the L1 and L2 registers in order to add more protection to the algorithms against ABA.

To use this kind of randomization, consider the following indexing of the level 1 and level 2 registers: registers of level 1 can be indexed as Q[L7(0)] and Q[L1(1)] and registers of level 2 can be indexed as Q[L2(0)] and Q[L2(1)]. Based on this indexing, the above enhanced algorithms can be updated to accommodate the random association of registers to levels as shown below. These new algorithms represent the randomized version of the enhanced Takagi's algorithm, the ML binary algorithm and the LM binary algorithm respectively.

The new level-based randomization of the enhanced Takagi's ML algorithm is shown below:

```
INPUT      K, P
OUTPUT     KP
  1. Initialize Q[L1(0)] = P; Q[L1(1)] = 2P
       for i = n-2 down to 0
  2. In parallel: Q[L2(0)] = Q[2+ k_i];   Q[L2(1)] = Q[3- k_i]
  3. Q[L1(0)] = DBL(L2(0))
  4. Q[L1(0)] = ADD(L2(0, Q[L2(1)])
  5. In parallel: Q[L2(0)] = Q[2+ k_i];   Q[L2(1)] = Q[3- k_i]
  6. In parallel: Q[L1(0)] = Q[L2(0)];    Q[L1(1)] = Q[L2(1)]
  end for
    return Q[L2(0)]
```

The level-based randomization of the enhanced ML binary algorithm is shown below:

```
INPUT      K, P
OUTPUT     KP
  1. Initialize Q[L2(0)] = P
       for i = n-2 down to 0
  2. Q[L1(0)] = DBL(Q[L2(0)]);            Q[L1(1)] = P
  3. In parallel: Q[L2(0)] = Q[L1(0)];    Q[L2(1)] = Q[L1(1)]
  4. Q[L1(1)] = ADD(Q[L2(0)], Q[L2(1)])
  5. In parallel: Q[L2(0)] = Q[2+ k_i];   Q[L2(1)] = Q[3- k_i].
  end for
    return Q[L2(0)]
```

The level-based randomization process of the enhanced LM binary algorithm is given below:

```
INPUT      K, P
OUTPUT     KP
  1. Initialize Q[L2(1)] = P; Q[L1(0)] = P
       for i = 1 to n-1
  2. Q[L2(0)] = DBL(Q[L1(0)])
  3. Q[L1(1)] = ADD(Q[L2(0)], Q[L2(1)])
  4. Q[L1(0)] = Q[L2(1)]
  5. In parallel: Q[L2(1)] = Q[2+ k_i];    Q[L2(0)] = Q[3- k_i];
                  Q[L1(0)] = Q[L2(0)]
  end for
    return Q[L2(1)]
```

The level-based randomization process of any of the above algorithms can be performed by using the following steps:
1. Set range={0, 1, 2, 3}
2. Generate a random number $r_0$=random(range)
3. Generate a random number $r_1$=random(range-$\{r_0\}$)
4. Generate a random number $r_2$=random(range-$\{r_0, r_1\}$)
5. Q[L1(0)]=$r_0$; Q[L1(1)]=$r_1$; Q[L2(0)]=$r_2$; Q[L2(1)]=range-$\{r_0, r_1, r_2\}$;

These steps can be plugged into any of the above algorithms to add more protection against ABA. However, any suitable method of randomization steps other than the steps above may be applied. The main objective of such a randomization scheme is considered to be satisfied with any method that can fairly utilize the search space of all possible registers-to-level associations.

An SRA operation requires a time overhead of one cycle, which is negligible when compared with the number of cycles needed to perform EC basic operations. With regard to the additional cost, it only requires two registers and either 2 or 4 multiplexers, depending on the implementation used. This additional cost in hardware is, again, negligible compared to the amount of hardware needed to perform finite filed arithmetic.

It is to be understood that the present invention is not limited to the embodiments described above, but encompasses any and all embodiments within the scope of the following claims.

We claim:

1. A method of performing scalar multiplication using simultaneous register access without memory access which is protected against address bit attack due to fetching instructions or data, comprising the steps of:

(1) providing an arithmetic processing unit, first, second, third and fourth registers, and first, second, third and fourth multiplexers;

(2) defining point values Q[0], Q[1], Q[2] and Q[3] held in the first, second, third and fourth registers, respectively, and further defining initial point values P and 2P;

(3) setting Q[2] equal to P and Q[3] equal to 2P;

(4) establishing a control selection line in communication with the first and second multiplexers, and further establishing a current scalar bit value $k_i$ and feeding $k_i$ to the first multiplexer through the control selection line, and feeding $1-k_i$ to the second multiplexer through the control selection line;

(5) starting from the next most significant bit, repeating the following steps (6) through (10) until all bits of the scalar are processed;

(6) performing the two following simultaneous register access operations that access at the same time and without leaving any register idle:

(i) a first simultaneous register access operation to establish the operand of a doubling operation, which is also the operand of an addition operation in the first register;

(ii) a second simultaneous register access operation to establish the second operand of an addition operation in the second register;

(7) storing the result of the doubling operation in the third register;

(8) storing the result of the addition operation in the fourth register;

(9) performing the following two simultaneous register access operations that access at the same time and without leaving any register idle:
  (i) a first simultaneous register access operation to transfer the result of either the doubling operation, which is stored in the third register, or the addition operation, which is stored in the fourth register, to the first register;
  (ii) a second simultaneous register access operation to transfer the other register, which is either the third or fourth register, correspondingly, to the second register; and,

(10) in parallel and simultaneously accessing all registers at the same time and without leaving any register idle by transferring the contents of the first register to the third register and the contents of the second register to the fourth register independently from the scalar bit value, wherein the simultaneous register access operations of step (9) are performed with simultaneous access of the first, second, third and fourth registers when the scalar bit value is 0 and 1 with the same sequence at every scalar multiplication iteration thereby accessing all four registers simultaneously in one cycle in both cases when the scalar bit value is 0 and 1 thereby preventing fetching instructions or data which requires accessing memory in order to mask address correlation between operand and destination addresses and the scalar bit value.

2. The method of performing scalar multiplication which is protected against address bit attack as recited in claim 1, wherein the control selection line selectively controls input to the third and fourth registers.

3. The method of performing scalar multiplication which is protected against address bit attack as recited in claim 2, further comprising the step of establishing a scalar value S1 associated with the control selection line.

4. The method of performing scalar multiplication which is protected against address bit attack as recited in claim 3, wherein if S1=0, an output of the arithmetic processing unit is selected as input to the third and fourth registers, and if S1=1, Q[0] is selected as input to the third register, and Q[1] is selected as input to the fourth register.

5. The method of performing scalar multiplication which is protected against address bit attack as recited in claim 1, wherein the first and second simultaneous register access operations each include the steps of:
  setting Q[0] equal to Q[2] and setting Q[1] equal to Q[3] if $k_i=0$; and,
  setting Q[1] equal to Q[2] and setting Q[0] equal to Q[3] if $k_i=1$.

6. The method of performing scalar multiplication which is protected against address bit attack as recited in claim 1, wherein the simultaneous register access operations of said steps (6) and (9) are each general simultaneous register access operations.

7. A method of performing scalar multiplication using simultaneous register access without memory access which is protected against address bit attack due to fetching instructions or data, comprising the steps of:

(1) providing an arithmetic processing unit, first, second, third and fourth registers, and first, second, third and fourth multiplexers;

(2) defining point values Q[0], Q[1], Q[2] and Q[3] held in the first, second, third and fourth registers, respectively, and further defining an initial point value P;

(3) setting Q[0] equal to P;

(4) establishing a control selection line in communication with the first and second multiplexers, and further establishing a current scalar bit value $k_i$ and feeding $k_i$ to the first multiplexer through the control selection line, and feeding $1-k_i$ to the second multiplexer through the control selection line;

(5) starting from the next most significant bit, repeating the following steps (6) through (10) until all bits of the scalar are processed;

(6) storing the result of the doubling operation in the third register;

(7) setting Q[3] equal to P;

(8) in parallel and simultaneously accessing all registers at the same time and without leaving any register idle by transferring the contents of the third register to the first register and the contents of the fourth register to the second register independently from the scalar bit value;

(9) storing the result of the addition operation in the fourth register; and,

(10) performing the following two simultaneous register access operations that access at the same time and without leaving any register idle:
  (i) a first simultaneous register access operation to transfer the result of either the doubling operation, which is stored in the third register, or the addition operation, which is stored in the fourth register to the first register;
  (ii) a second simultaneous register access operation to transfer the other register, which is either the third or fourth register, correspondingly, to the second register, wherein the simultaneous register access operations of step (10) are performed with simultaneous access of the first, second, third and fourth registers when the scalar bit value is 0 and 1 with the same sequence at every scalar multiplication iteration thereby accessing all four registers simultaneously in one cycle in both cases when the scalar bit value is 0 and 1 thereby preventing fetching instructions or data which requires accessing memory in order to mask address correlation between operand and destination addresses and the scalar bit value.

8. The method of performing scalar multiplication which is protected against address bit attack as recited in claim 7, wherein the first and second simultaneous register access operations of said step (10) each include the steps of:
  setting Q[0] equal to Q[2] and setting Q[1] equal to Q[3] if $k_i=0$; and,
  setting Q[1] equal to Q[2] and setting Q[0] equal to Q[3] if $k_i=1$.

9. The method of performing scalar multiplication which is protected against address bit attack as recited in claim 7, wherein the first and second simultaneous register access operations of said step (10) are each general simultaneous register access operations.

10. The method of performing scalar multiplication which is protected against address bit attack as recited in claim 7, wherein the control selection line selectively controls input to the third and fourth registers.

11. The method of performing scalar multiplication which is protected against address bit attack as recited in claim 10, further comprising the step of establishing a control value S1 associated with the control selection line, wherein if S1=0, an output of the arithmetic processing unit is selected as an input to the third and fourth registers, and if S1=1 then Q[0] is selected as an input to the third register, and Q[1] is selected as an input to the fourth register.

12. A method of performing scalar multiplication using simultaneous register access without memory access which is protected against address bit attack due to fetching instructions or data, comprising the steps of:
   (1) providing an arithmetic processing unit, first, second, third, and fourth registers, and first, second, third, fourth, fifth and sixth multiplexers;
   (2) defining point values Q[0], Q[1], Q[2] and Q[3] held in the first, second, third and fourth registers, respectively, and further defining an initial point value P;
   (3) setting Q[1] equal to P and Q[2] equal to P;
   (4) establishing a pair of control selection lines in communication with the first, second, third, fourth, fifth and sixth multiplexers, and further establishing a current scalar bit value $k_i$ and selectively feeding 0, 1, $k_i$ or $1-k_i$ to the first, second, third, fourth, fifth and sixth multiplexers through the pair of control selection lines;
   (5) starting from the next least significant bit, repeating the following steps (6) through (10) until all bits of the scalar are processed;
   (6) storing the result of the doubling operation in the first register;
   (7) storing the result of the addition operation in the fourth register;
   (8) transferring the contents of the second register to the third register independently from the scalar bit value;
   (9) performing the two following simultaneous register access operations that access at the same time and without leaving any register idle:
       (i) a first simultaneous register access operation to selectively transfer the contents of either the third register or the fourth register to the second register;
       (ii) a second simultaneous register access operation to transfer the other corresponding register to the first register;
   (10) transferring the contents of the first register to the third register independently from the scalar bit value, wherein the simultaneous register access operations of step (9) are performed with simultaneous access of the first, second, third and fourth registers when the scalar bit value is 0 and 1 with the same sequence at every scalar multiplication iteration thereby accessing all four registers simultaneously in one cycle in both cases when the scalar bit value is 0 and 1 thereby preventing fetching instructions or data which requires accessing memory in order to mask address correlation between operand and destination addresses and the scalar bit value.

13. The method of performing scalar multiplication which is protected against address bit attack as recited in claim 12, wherein the control selection lines selectively control input to the third and fourth registers.

14. The method of performing scalar multiplication which is protected against address bit attack as recited in claim 13, further comprising the step of establishing a pair of control values S0 and S1 respectively associated with the pair of control selection lines.

15. The method of performing scalar multiplication which is protected against address bit attack as recited in claim 14, wherein if S0=0 and S1=0 then an output of the arithmetic processing unit is selected as an input the first register, and if S0=0 and S1=1 then an output of the arithmetic processing unit is selected as an input to the second register, and if S0=1 and S1=0 then an output of the arithmetic processing unit is selected as an input to the third register, and if S0=1 and S1=1 then an output of the arithmetic processing unit is selected as an input to the fourth register.

16. The method of performing scalar multiplication which is protected against address bit attack as recited in claim 12, wherein the simultaneous register access operations of step (9) each include the steps of:
   setting Q[1] equal to Q[2] and setting Q[0] equal to Q[3] if $k_i$=0; and,
   setting Q[1] equal to Q[3] and setting Q[0] equal to Q[2] if $k_i$=1.

17. The method of performing scalar multiplication which is protected against address bit attack as recited in claim 12, wherein the simultaneous register access operations of said step (9) are each general simultaneous register access operations.

* * * * *